Feb. 26, 1957   A. W. HAAS   2,782,931
TRAPS FOR PEELERS
Filed June 8, 1954
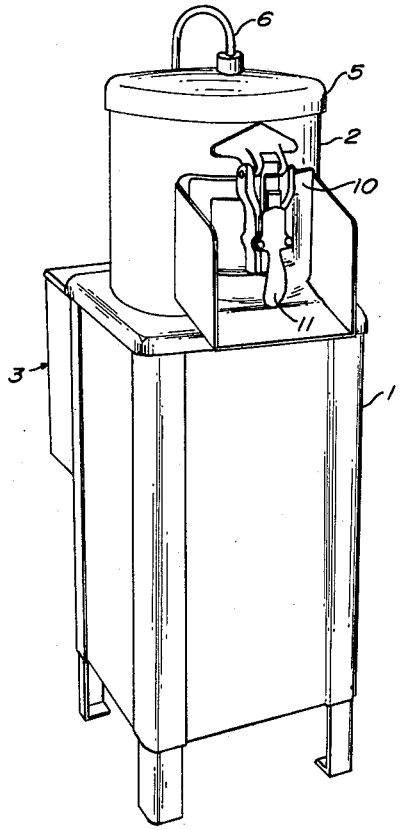
Fig. I
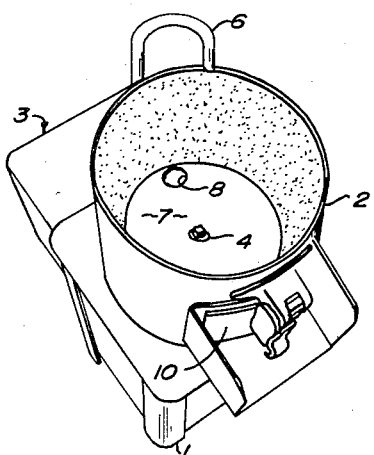
Fig. II
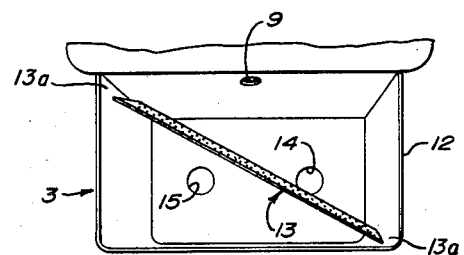
Fig. III
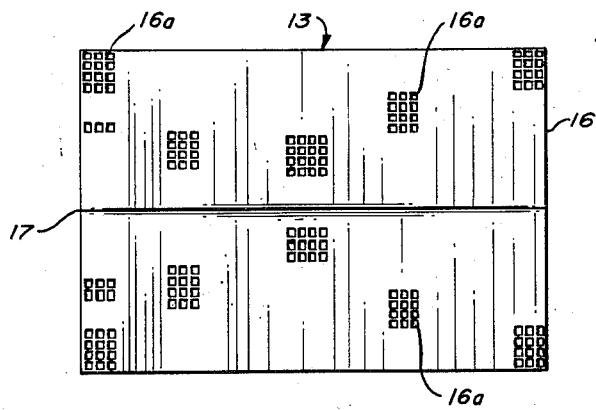
Fig. IV
Fig. V
INVENTOR.
ARTHUR W. HAAS
BY
Marshall, Marshall & Yeasting
ATTORNEYS United States Patent Office 2,782,931
Patented Feb. 26, 1957

2,782,931
TRAPS FOR PEELERS

Arthur W. Haas, Rochester, N. Y., assignor to Toledo Scale Company, Toledo, Ohio, a corporation of New Jersey Application June 8, 1954, Serial No. 435,185

1 Claim. (Cl. 210—149)

This invention relates to improvements in peeling machines and in particular to an improved refuse trap for such machines.

Vegetable peeling machines of the type to which the improved peeler trap of this invention is applied include means for peeling vegetables by moving them, by the undulating action of a wavy abrasive covered disc, within an abrasive lined stationary cylinder. The wavy disc imparts a rolling motion to the vegetables which exposes the peel to the abrasive on both the cylinder and the disc. While the rolling motion continues, water is introduced into the cylinder whereby ground peelings are washed from the vegetables.

The principal object of this invention is to provide an improved strainer which automatically separates the peel refuse from the water in a peeling machine trap which strainer is vibration-free, horizontally stiff, and needs no special securing means to hold it securely in the trap.

More specifically the principal object of the invention is to provide a strainer for a peeling machine trap comprising a substantially flat perforated resilient sheet having at least one crease parallel to a side of the sheet, the crease permitting the strainer to be held in the trap by being sprung between diagonally opposite corners of the trap which eliminates the need for special securing means and imparts vibration-free, horizontal stiffness to the strainer.

Another object of the invention is to provide an improved peeling machine trap having a removable horizontally stiff strainer located vertically in the trap and held in place under tension between diagonally opposite corners of the trap, dividing the trap into two parts, one part having an outlet for the solid portion of the refuse and the other part having an outlet for water separated from the refuse, the strainer optionally being located between any of the diagonally opposite corners whereby said parts of the trap optionally may be used as retainers for the solid portion of the refuse or for water separated from the refuse.

More specific objects and advantages are apparent from the following description of a specific embodiment of the invention.

According to the invention, a peeling machine is provided with a refuse trap comprising a box-like receptacle having a refuse inlet in one of its sides, and a rectangularly shaped perforated sheet having a horizontal crease which imparts horizontal stiffness and a flattened V-shaped form to the sheet, said sheet being positioned vertically in the receptacle and being held in place under tension by being sprung between diagonally opposite corners, for dividing the receptacle into two parts, one part having an outlet in its bottom for the solid portion of the refuse and the other part having an outlet in its bottom for water separated from the refuse.

The invention may be more readily understood from the following detailed description of a specific embodiment in which description reference is made to the accompanying drawing.

In the drawing:

Figure I is a perspective view of a peeling machine embodying the invention, showing the position of the improved refuse trap.

Figure II is a perspective view of the interior of the peeling machine shown in Figure I.

Figure III is a perspective view of the interior of the refuse trap showing the position of the improved strainer held in the trap by being sprung between diagonally opposite corners.

Figure IV is an enlarged front elevational view of the improved strainer.

Figure V is an enlarged end elevational view of the strainer shown in Figure IV.

The peeling machine which is illustrated in the figures above described is of the general type shown and described in United States Patent No. 1,923,806 to George P. Anstiss. The machine has three units, namely, a base 1 housing a motor, a stationary cylinder 2 supported by the base, and a peeler trap 3 to the rear of the base and below the stationary cylinder.

The stationary cylinder 2 houses a peeling disc similar to the one shown in detail in Figure 6 of United States Patent No. 1,923,806 and is removably mounted on the end of a motor-driven shaft 4 which extends from the base 1 upwardly into the bottom of the stationary cylinder.

Vegetables to be peeled are fed into the stationary cylinder 2 through a hopper 5 and fall upon the revolving peeling disc and at the same time water is fed through a pipe 6 located in the upper portion of the stationary cylinder 2. The vegetables are rolled within the stationary cylinder 2 by the action of the revolving peeling disc and contact sharp abrasive surfaces of the cylinder walls and the peeling disc whereby the peel is ground from the vegetables, as is well understood in the art. The water makes a mixture with the peelings and cleans the cylinder 2 forming refuse that flows between the edge of the peeling disc and the walls of the cylinder to the bottom 7 of the cylinder and out the opening 8 of a pipe which empties the refuse through a refuse inlet 9 into the peeler trap 3. The peeled vegetables are discharged from the cylinder 2 through a water-tight door 10 operated by means of a handle 11.

The present invention consists in providing an improved peeler trap for the peeling machine. The refuse mixture of water and ground peelings enters a box-like receptacle 12 of the trap 3 through the refuse inlet 9 and is separated into water and solid refuse by means of a strainer 13 located vertically between diagonally opposite corners 13a of the receptacle 12. The strainer 13 divides the receptacle into two parts, one part having an outlet 14 for the solid portion of the refuse and the other part having an outlet 15 for water separated from the refuse. The peeler trap automatically separates the water from the solid portion of the refuse and can be emptied without shutting down the peeling machine. The peelings can be emptied directly into a waste can and the water, free of solid material, may be permitted to flow into a sewer drain.

The strainer 13 comprises a substantially flat rectangularly shaped foraminous resilient sheet 16 having perforations 16a and at least one crease 17 parallel to a side of the sheet. The crease 17 permits the strainer 13 to be held securely in the receptacle 12 of the peeler trap 3 by being sprung between diagonally opposite corners. This method of holding the strainer 13 in the receptacle 12 eliminates any need of special securing means for the strainer, such as screws or bosses, and allows the strainer to be easily and quickly inserted or removed.

The horizontal crease 17 imparts horizontal stiffness to the resilient sheet 16 when the sheet is held under tension between diagonally opposite corners of the receptacle 12. This stiffness prevents the sheet 16 from vibrating when refuse is being strained. This is a great advantage, since it permits the strainer 13 to be made from a thin inexpensive resilient sheet.

The improved strainer 13 has, thus, several advantages. It is formed from a thin inexpensive sheet which is easily creased whereby the cost of manufacture is very low. The strainer is held in place under tension between diagonally opposite corners of the receptacle so that no special securing means are needed whereby the cost of manufacture of the peeler trap is reduced. However, the low cost strainer at the same time is improved. It may be easily and quickly inserted or removed from the peeler trap, it is horizontally stiff and does not vibrate, and it can be optionally placed between any two diagonally opposite corners whereby the parts of the peeler trap optionally may be used as retainers for the solid portion of the refuse or for water separated from the refuse.

The embodiment of the invention herein shown and described is to be regarded as illustrative only, and it is to be understood that the invention is susceptible to variation within the scope of the subjoined claim.

Having described the invention, I claim:

A peeler trap comprising, in combination, a box-like receptacle having a refuse inlet, and a rectangularly shaped perforated resilient sheet having a single horizontal crease which imparts a flattened V-shaped form to the sheet, said sheet being positioned vertically in the receptacle and being held in place under tension by being sprung between diagonally opposite corners of the receptacle to divide the receptacle into two parts, one of said parts having an outlet for the solid portion of the refuse and the other of said parts having an outlet for water separated from the refuse, said crease imparting horizontal stiffness to the sheet when the sheet is held under tension between said opposite corners.

References Cited in the file of this patent

UNITED STATES PATENTS

| | | |
|---|---|---|
| Re. 7,039 | Randon | Apr. 4, 1876 |
| 1,188,280 | Kuenzli | June 20, 1916 |
| 1,254,125 | Dash | Jan. 22, 1918 |
| 1,287,856 | Brandt | Dec. 17, 1918 |
| 1,653,473 | Schulz | Dec. 20, 1927 |
| 2,573,836 | Fox et al. | Nov. 6, 1951 |

FOREIGN PATENTS

| | | |
|---|---|---|
| 330,796 | Germany | Dec. 22, 1920 |
| 869,936 | Germany | Mar. 9, 1953 |